US012226360B1

(12) United States Patent
Paolillo

(10) Patent No.: US 12,226,360 B1
(45) Date of Patent: Feb. 18, 2025

(54) MASSAGE TOOLS AND METHODS OF USE

(71) Applicant: THE MENDING MASSAGE EGGS INC., New York, NY (US)

(72) Inventor: John B. Paolillo, New York, NY (US)

(73) Assignee: THE MENDING MASSAGE EGGS INC., New York, NY (US)

( * ) Notice: Subject to any disclaimer, the term of this patent is extended or adjusted under 35 U.S.C. 154(b) by 0 days.

(21) Appl. No.: 18/621,981

(22) Filed: Mar. 29, 2024

(51) Int. Cl.
*A61H 15/00* (2006.01)

(52) U.S. Cl.
CPC . *A61H 15/0092* (2013.01); *A61H 2015/0042* (2013.01); *A61H 2201/1695* (2013.01)

(58) Field of Classification Search
CPC .... A61H 15/00; A61H 15/0092; A61H 15/02; A61H 2015/0007–0071; A61H 39/04; A61H 7/002–003; A61H 7/001; A61H 2201/1692–1695; A61H 7/007; A01K 15/025–026; A63B 22/20
USPC .................................................. D24/211–215
See application file for complete search history.

(56) References Cited

U.S. PATENT DOCUMENTS 3,364,922 A * 1/1968 Teranishi ........... A61H 23/0263 601/72
3,411,498 A * 11/1968 Reiter .................... A61H 7/001 601/131
4,378,007 A * 3/1983 Kachadourian ........ A61H 15/00 482/79
D356,355 S * 3/1995 Martin .......................... D21/712
5,531,666 A * 7/1996 Hung ................. A61H 15/0092 601/129
5,766,210 A * 6/1998 Komoroczy ....... A61H 15/0092 601/107
7,238,161 B2 * 7/2007 Komkin ............. A61H 15/0092 601/40
D583,519 S * 12/2008 Roberts ........................ D32/29.1
D646,448 S * 10/2011 Cheng .......................... D32/29.1
D695,370 S * 12/2013 Hedeen, Jr. .................. D21/712
9,039,641 B1 * 5/2015 Johnson ............. A61H 15/0092 601/136
10,441,496 B1 * 10/2019 Cohen .................... A61H 15/02
D992,133 S * 7/2023 Goerges ....................... D24/212
D1,009,289 S * 12/2023 Yu ................................ D24/211
(Continued)

FOREIGN PATENT DOCUMENTS

CN 202497662 U * 10/2012
FR 2723844 A1 * 3/1996 ......... A61H 15/0092
(Continued)

*Primary Examiner* — Tu A Vo
(74) *Attorney, Agent, or Firm* — Baker Botts L.L.P.

(57) ABSTRACT

A massage tool, including an egg-shaped body and a plurality of protuberances. The body has a first end portion and a second end portion, wherein a diameter of the first end portion is greater than a diameter of the second end portion, the body includes of a uniform, solid material, and the body has a rigidity. The protuberances extend radially from the body, wherein each protuberance has a first end portion and a second end portion. The first end portion of each protuberance is integral with the body and the second end portion of each protuberance extends radially from the body. The protuberances are arranged in a pattern around the body and include the uniform, solid material. Moreover, each protuberance has a rigidity, wherein the rigidity of each protuberance is less than the rigidity of the body.

13 Claims, 12 Drawing Sheets

(56) References Cited

U.S. PATENT DOCUMENTS

| | | | | | |
|---|---|---|---|---|---|
| D1,025,386 | S * | 4/2024 | Goerges | D24/212 | |
| 2003/0009118 | A1 * | 1/2003 | Sabo | A61H 15/00 | 601/137 |
| 2004/0193081 | A1 * | 9/2004 | Sils | A63B 21/00189 | 601/134 |
| 2007/0232970 | A1 * | 10/2007 | Kyoji | A63B 57/20 | 601/118 |
| 2011/0257569 | A1 * | 10/2011 | Robins | A61H 15/00 | 601/137 |
| 2013/0190664 | A1 * | 7/2013 | Johnson | A61H 15/00 | 601/129 |
| 2013/0281892 | A1 * | 10/2013 | Godfrey | A61H 1/00 | 601/70 |
| 2015/0005683 | A1 * | 1/2015 | Balducci | A61H 15/00 | 601/134 |
| 2016/0361223 | A1 * | 12/2016 | Muller | A61H 15/00 | |
| 2017/0106249 | A1 * | 4/2017 | Marton | A63B 21/00178 | |
| 2018/0042807 | A1 * | 2/2018 | Mallory | A61H 15/0092 | |
| 2018/0055719 | A1 * | 3/2018 | Maichel | A61H 7/002 | |
| 2018/0093127 | A1 * | 4/2018 | Hinduja | A63B 21/4025 | |
| 2020/0016026 | A1 * | 1/2020 | Depta | A61H 1/00 | |
| 2021/0077349 | A1 * | 3/2021 | Smith | A61H 15/00 | |
| 2021/0298988 | A1 * | 9/2021 | Watts-Russell | A61F 7/02 | |

FOREIGN PATENT DOCUMENTS

| | | | |
|---|---|---|---|
| KR | 20000020236 | U * | 4/1999 |
| KR | 20160022010 | A * | 2/2016 |
| KR | 102153565 | B1 * | 9/2020 |
| RU | 2336858 | C2 * | 10/2008 |
| WO | WO-8905622 | A1 * | 6/1989 |

* cited by examiner

MASSAGE TOOLS AND METHODS OF USE

BACKGROUND OF THE DISCLOSED SUBJECT MATTER

Field of the Disclosed Subject Matter

The disclosed subject matter relates to devices and methods for performing myofascial release therapy of a body part, such as a hand or foot.

Description of the Related Art

In myofascial release therapy, it is desirable to rehydrate the fascia tissue. Normally, a user will apply pressure to the fascia tissue using a tool to stimulate blood flow and synovial fluid circulation. After applying pressure, the tissue area fills with fluid, resulting in increased mobility and lessened neuropathy.

A variety of tools for myofascial release therapy exist, including hard rubber balls with smooth surfaces and hard plastic tools with smooth surfaces. Some tools include hard protrusions. However, the rigidity of these tools aggravates the fascia tissue, resulting in pain, inflammation, and further injury. Further, these tools are uniformly shaped. For example, some tools are sphere-shaped, some tools are dome-shaped, and other tools are cylinder-shaped. These shapes do not fit comfortably under a hand or foot, resulting in discomfort and decreased effectiveness during use.

There thus remains a continued need for an efficient and economic system for rehydrating fascia tissue without causing pain, inflammation, or discomfort to the user. The presently disclosed subject matter satisfies these and other needs.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a massage tool, including an egg-shaped body and a plurality of protuberances. The body has a first end portion and a second end portion, wherein a diameter of the first end portion is greater than a diameter of the second end portion, the body includes of a uniform, solid material, and the body has a rigidity. The protuberances extend radially from the body, wherein each protuberance has a first end portion and a second end portion. The first end portion of each protuberance is integral with the body and the second end portion of each protuberance extends radially from the body. The protuberances are arranged in a pattern around the body and include the uniform, solid material. Moreover, each protuberance has a rigidity, wherein the rigidity of each protuberance is less than the rigidity of the body.

The diameter of the first end portion of the body does not exceed about 40 mm. The length of the body does not exceed about 50 mm.

Each protuberance can have a conical shape. The second end portion of each protuberance can be rounded. The first end portion of each protuberance can have a diameter and the second end portion of each protuberance can have a diameter and the diameter of the first end portion of each protuberance can be greater than the diameter of the second end portion of each protuberance. The diameter of each protuberance does not exceed about 5/16 of an inch. The height of each protuberance does not exceed about 1/4 of an inch.

The body and plurality of protuberances can be monolithically formed. The uniform, solid material can be a thermoplastic rubber. The body and plurality of protuberances can have a durometer hardness of about 20 Shore A. The massage tool can be capable of withstanding an applied force of 950 N.

The disclosed subject matter includes a method of using the massage tool that can include placing the massage tool on a flat surface, pressing a foot onto the massage tool while rolling the massage tool under the foot, and pressing the foot onto the massage tool while the massage tool is stationary.

The disclosed subject matter includes another method of using the massage tool that can include rolling the massage tool between the right and the left hand while pressing the massage tool between the right and left hand and squeezing the massage tool between two fingers. This method can further include gripping the massage tool in one hand, pressing a thumb onto the proximal side of the massage tool, pressing the thumb onto the distal side of the massage tool, and pressing the thumb onto the second end portion of the massage tool.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Figure 1C:
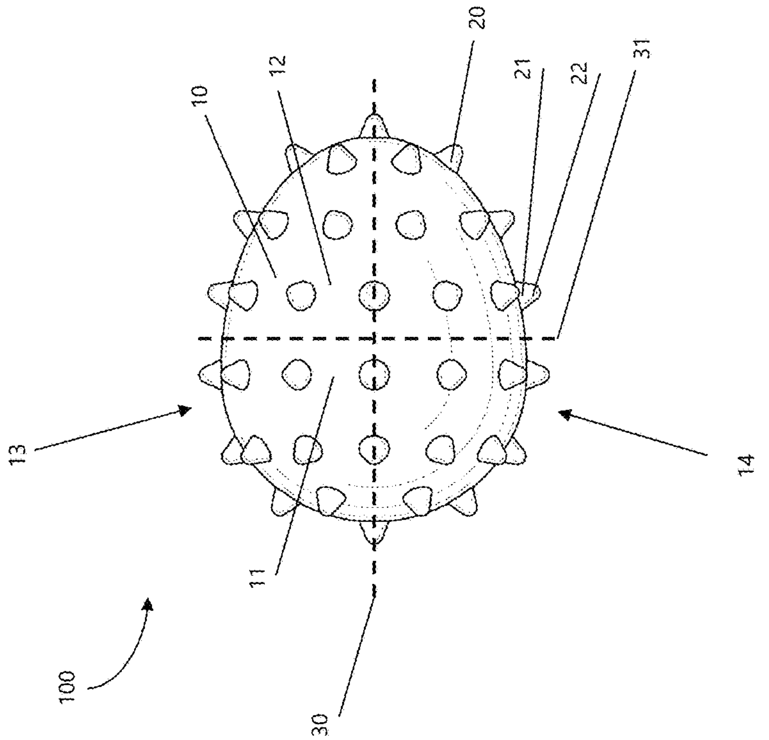
FIG. 1C illustrates a side view of the massage tool of FIG. 1A.

Reference will now be made in detail to embodiments of the disclosed subject matter, an example of which is illustrated in the accompanying drawings. The disclosed subject matter will be described in conjunction with the detailed description of the system and methods.

As disclosed herein, the devices presented herein can be used for rehydration of fascia tissue. Referring now to the drawings, wherein like reference numbers are used herein to designate like elements throughout, the various views and embodiments of a massage tool 100 and methods of using the same are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1A:
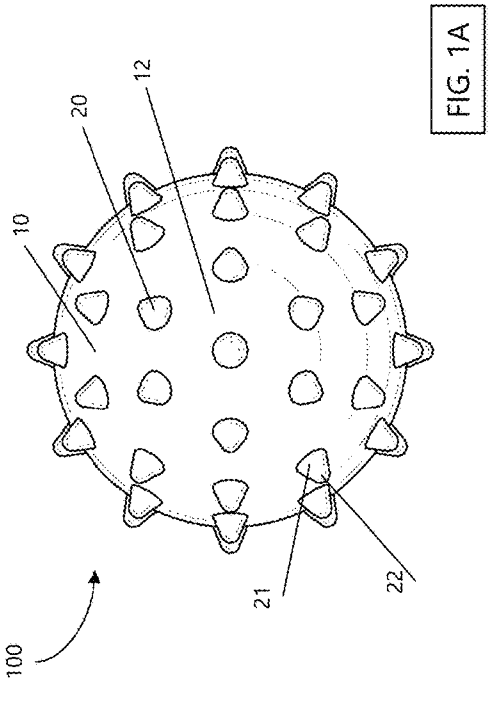
FIG. 1A illustrates a top view of a massage tool, in accordance with the disclosed subject matter.
Figure 1B:
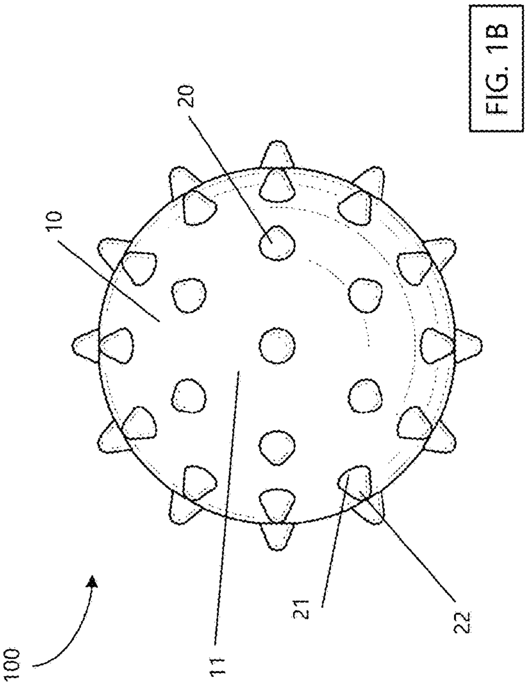
FIG. 1B illustrates a bottom view of the massage tool of FIG. 1A.
Figure 7:
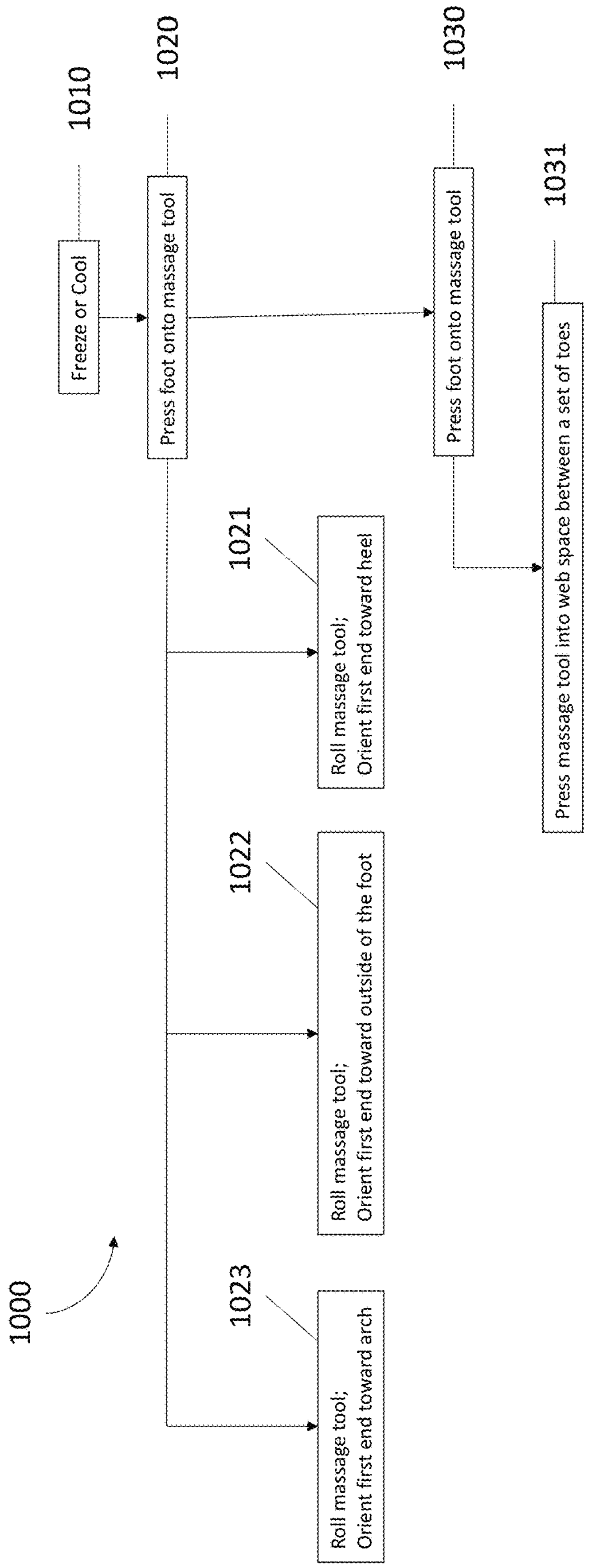
FIG. 7 illustrates a method for using the massage tool in accordance with the disclosed subject matter.

A massage tool 100 is illustrated in FIG. 1. In accordance with the disclosed subject matter, a massage tool 100 can include a body 10 and a plurality of protuberances 20. The body 10 can be egg shaped, having a first end portion 11 and a second end portion 12. The diameter of the first end portion 11 of the body 10 can be greater than the diameter of the second end portion 12 of the body 10, such that the massage tool 100 can provide a varied diameter for massaging a hand or foot. The varied diameter can allow a user to make contact with a certain portion of the massage tool 100, depending on a desired use. For example, when the massage tool 100 is placed on a flat surface 40, a user who desires a greater diameter can make contact with the first end portion 11 of the body 10, whereas a user who desires a lesser diameter can make contact with the second end portion 12 of the body 10. Additionally, the body can include a proximal side 13 and a distal side 14. The proximal side 13 can be opposite the distal side 14 relative to the major axis 30. The massage tool 100 can be symmetrical such that the proximal side 13 has the same shape as the distal side 14. Additionally, the egg shape of the massage tool 100 can be such that the massage tool 100 can fit comfortably under a user's hand or foot. For example, the egg shape can fit into a user's hand or under a user's foot more comfortably than a fully round, spherical, dome, or cylindrical shape, among others. Further, the body 10 can include a uniform, solid material and can have a rigidity. The plurality of protuberances 20 can extend radially from the body 10. Each protuberance 20 can have a first end portion 21 and a second end portion 22. The first end portion 21 of each protuberance 20 can be integral with the body 10 and the second end portion 22 of each protuberance 20 can extend radially from the body 10. The protuberances 20 can provide points of pressure to a hand or foot. By concentrating pressure in certain points, the massage tool 100 can rehydrate fascia tissue and promote movement of blood and synovial fluid without causing pain to the user. The protuberances 20 can be arranged in a pattern throughout the body 10 (as described in greater detail below) and can include a uniform, solid material. Further, each protuberance 20 can have a rigidity, wherein the rigidity of each protuberance 20 can be less than the rigidity of the body 10. Referring now to FIG. 7, the rigidity of the body 10 can be such that, during use, the body 10 maintains its shape. The rigidity of the protuberances 20 can be such that, during use, the protuberances 20 conform to a user's hand or foot while providing points of pressure sufficient to rehydrate fascia tissue and promote movement of blood and synovial fluid without aggravating the user's fascia tissue. The body 10 and plurality of protuberances 20 can have a durometer hardness of about 15 Shore A to about 25 Shore A. For example, the body 10 and plurality of protuberances 20 can have a durometer hardness of about 20 Shore A. As another example, the massage tool 100 can withstand an applied force of about 950 N. Further, the massage tool can withstand this applied force without permanently deforming. As another example, the body 10 and plurality of protuberances 20 can have different respective durometer hardnesses.

Figure 2:
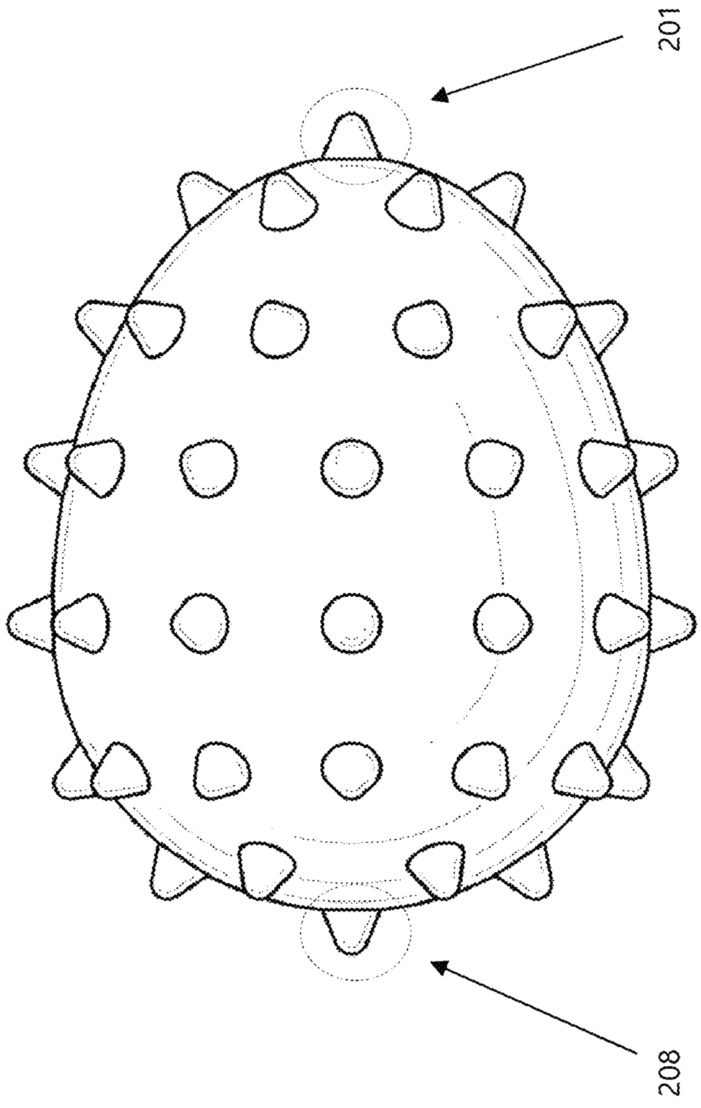
FIG. 2 illustrates a side view of the massage tool of FIG. 1A.
Figure 3:
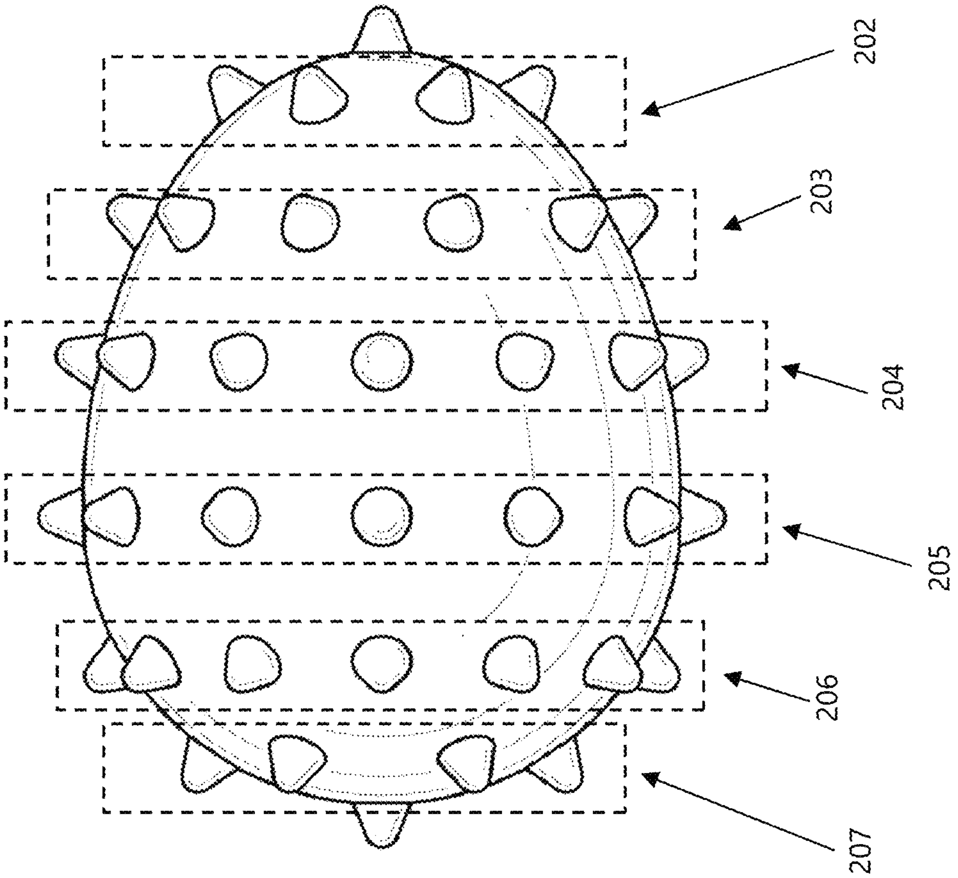
FIG. 3 illustrates a side view of the massage tool of FIG. 1A.
Figure 5:
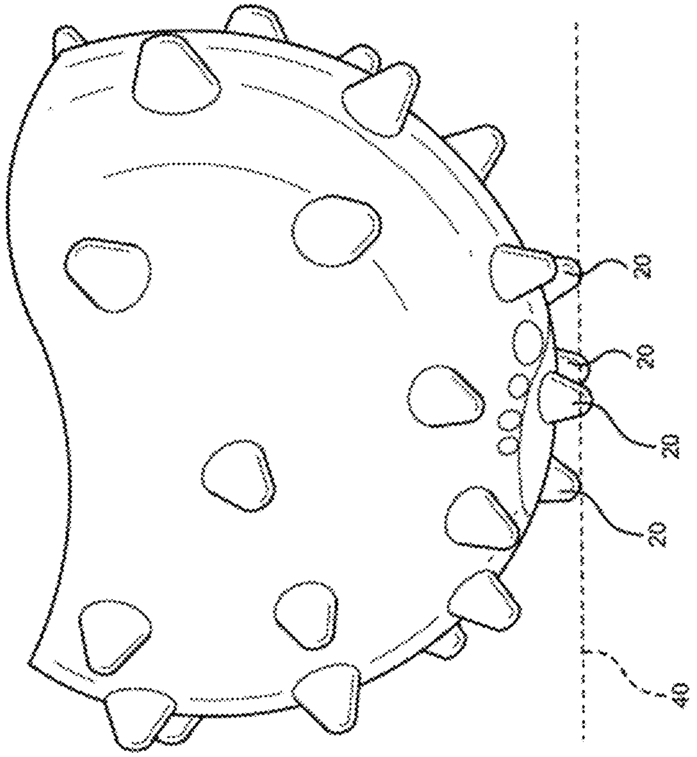
FIG. 5 illustrates the massage tool positioned on four protuberances.
Figure 6:
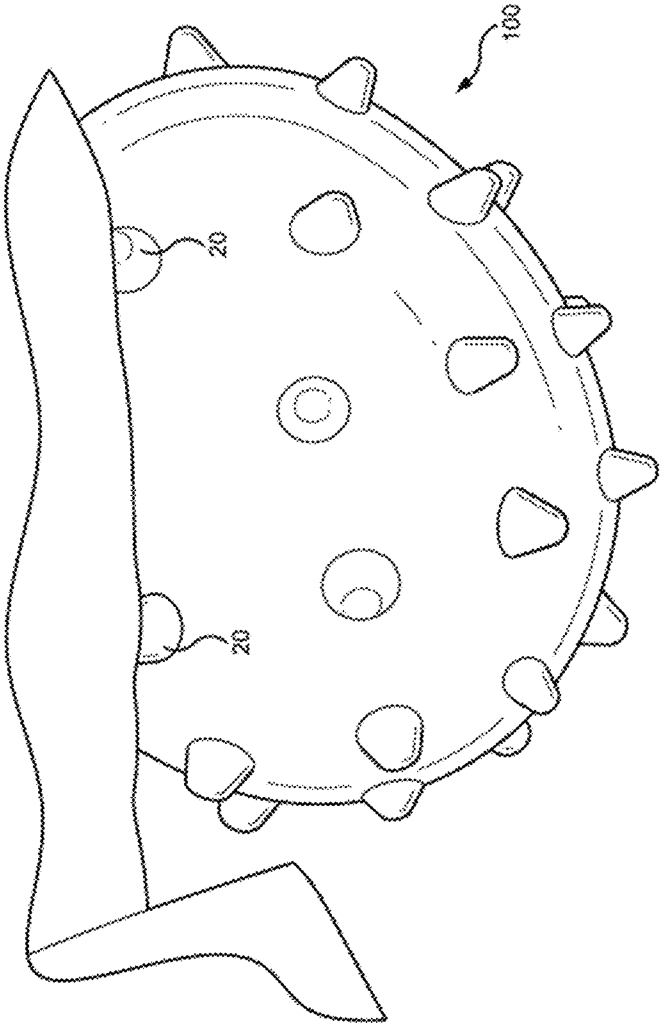
FIG. 6 illustrates the massage tool in use.

Referring to FIG. 1, the rows of protuberances 20 can be arranged in a pattern throughout the body such that the protuberances 20 align along the major axis 30 of the massage tool 100. Referring to FIG. 2 and FIG. 3, and in accordance with the disclosed subject matter, the body 10 can contain eight rows 200 of protuberances 20. Each row 200 of protuberances 20 can be equidistant from the preceding and succeeding rows. The body 10 can include a first row 201 at the first end portion 11 that contains a singular protuberance 20 and an eighth row 208 at the second end portion 12 that contains a singular protuberance 20. The second row 202 can contain six evenly spaced protuberances 20. The third row 203 can contain ten evenly spaced protuberances 20. The fourth row 204 can contain twelve evenly spaced protuberances 20. The fifth row 205 can contain twelve evenly spaced protuberances 20. Further, and in reference to FIG. 5, the fourth row 204 and fifth row 205 can be arranged in parallel, such that the massage tool 100 can rest on four equidistant protuberances 20 when placed on a flat surface 40, thereby providing a stable base and preventing the massage tool 100 from rolling when not in use. The sixth row 206 can contain twelve evenly spaced protuberances 20. The seventh row 207 can contain six evenly spaced protuberances 20. Regardless of the size of the massage tool 100, the number of rows 200 of protuberances 20 and number of protuberances 20 can be such that the protuberances 20 align along the major axis 30 of the massage tool 100. That is, the massage tool 100 can be larger or smaller. In a larger embodiment, there can be a greater number of rows 200 of protuberances 20 and a greater number of protuberances 20, such that the protuberances 20 align along the major axis 30 of the massage tool 100. In a smaller embodiment, there can be a lesser number of rows 200 of protuberances 20 and a lesser number of protuberances 20, such that the protuberances 20 align along the major axis 30 of the massage tool 100. Moreover, regardless of the size of the massage tool 100, there can be two middle rows 200 of protuberances 20 that can be arranged in parallel, such that the massage tool 100 can rest on four equidistant protuberances 20 when placed on a flat surface 40, thereby providing a stable base and preventing the massage tool 100 from rolling when not in use. The rows 200 of protuberances 20 can be arranged such that the massage tool 100 rolls in a curved shape when a force is acted upon it. For example, the protuberances 20 can be arranged such that the massage tool 100 rolls along the natural curve of a hand or foot when in use.

Referring to FIG. 1 for purpose of illustration and not limitation, the maximum diameter of the first end portion 11 of the body 10 can be between about 20 mm to about 60 mm. For example, the diameter of the first end portion 11 of the body 10 can be less than or equal to 36 mm. Alternatively, the diameter of the first end portion 11 of the body 10 can less than or equal to 41 mm. The diameter of the first end portion 11 of the body 10 can less than or equal to 40 mm. The diameter of the first end portion 11 of the body 10 can less than or equal to 46 mm. The maximum length of the body 10 can be between about 30 mm to about 70 mm. For example, the length of the body 10 can be about 44 mm or less. Alternatively, the length of the body 10 can be about 50 mm or less. The length of the body 10 can be about 59 mm or less. The length of the body 10 can be about 62 mm or less.

Figure 4:
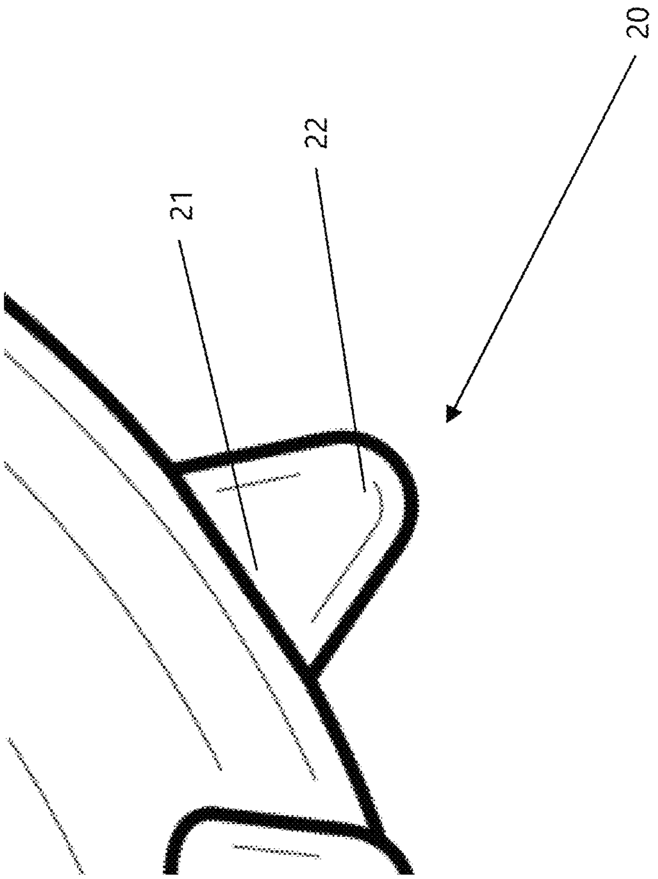
FIG. 4 illustrates a protuberance in accordance with the disclosed subject matter.

Referring to FIG. 4 for purpose of illustration and not limitation, each protuberance 20 can have a conical shape. The conical shape can provide a point of pressure to the user sufficient to rehydrate fascia tissue. The second end portion 22 of each protuberance 20 can be rounded. The rounded shape can enable each protuberance 20 to partially conform to a user's hand or foot and can avoid causing pain to the user. The first end portion 21 of each protuberance 20 can have a diameter and the second end portion 22 of each protuberance 20 can have a diameter. The diameter of the first end portion 21 of each protuberance 22 can be greater than the diameter of the second end portion 22 of each protuberance 20. This structure can enable each protuberance 20 to partially conform to the shape of the user's hand or foot while maintaining enough stability to provide a point of pressure sufficient to rehydrate fascia tissue. Additionally, when both the body 10 and the protuberances 20 are formed of the same material, this structure can provide the protuberances 20 with a rigidity that is less than the rigidity of the body 10. Referring to FIG. 4 for purpose of illustration and not limitation, the maximum diameter of the first end portion 21 of each protuberance 20 can be between about ⅛ of an inch to about ½ of an inch. For example, the diameter of the first end portion 21 of each protuberance 20 can be less than or equal to about 5⁄16 of an inch. The maximum height of each protuberance 20 can be between about 1⁄16 of an inch to about 7⁄16 of an inch. For example, the height of each protuberance 20 can be less than or equal to about ¼ of an inch.

The body 10 can be solid. Alternatively, the body 10 can include a hollow portion. The body 10 and the plurality of protuberances 20 can include a uniform, solid material. That is, the body 10 and the plurality of protuberances 20 can be monolithically formed, for example, by casting a material in a single mold. Moreover, the uniform, solid material can include a thermoplastic rubber. That is, the body 10 and the plurality of protuberances 20 can include a thermoplastic rubber, for example, by casting thermoplastic rubber in a single mold. Alternatively, the body 10 and the plurality of protuberances 20 can be separately formed. For example, the body 10 and plurality of protuberances 20 can be formed using separate molds and later joined together. Moreover, the body 10 and plurality of protuberances 20 can be formed of different materials. For example, the body 10 can include a high rigidity rubber and the plurality of protuberances 20 can include a low rigidity rubber. Alternatively, the body 10 can include a low rigidity rubber and the plurality of protuberances 20 can include a high rigidity rubber. In accordance with the subject matter previously described the components of the massage tool 100 can be made from a variety of suitable materials. For instance, the body 10 and plurality of protuberances 20 can be formed of natural or synthetic rubber, silicone, cork, plastic, wood, foam, or other materials. The material forming the body 10 and plurality of protuberances 20 can be capable of being cooled or heated without permanently deforming. For example, the material forming the body 10 and plurality of protuberances 20 can be cooled or heated, using, among other things, body heat from a hand or foot or heat from hot water, without permanently deforming. The material forming the body 10 and plurality of protuberances 20 can be cooled or heated without becoming more or less rigid. Additionally, the material forming the body 10 and plurality of protuberances 20 can be absorptive, such that a liquid can be infused into the material. For example, the material can be infused with lavender oil, or other essential or pleasantly smelling oils, after soaking the massage tool 100 in such oil.

The massage tool 100 described herein has a variety of use cases and methods of use to rehydrate the fascia tissue of a user adequately and painlessly.

FIG. 7 illustrates an example method 1000 in accordance with the disclosed subject matter. This method 1000 can begin at step 1010, where the method 1000 can include placing the massage tool 100 on a flat surface 40. Optionally, prior to step 1010, the massage tool 100 can be frozen or cooled, for example, by placing the massage tool 100 in a freezer. Alternatively, prior to step 1010, the massage tool 100 can be heated. At step 1020, the method 1000 can include pressing a foot onto the massage tool 1000 while rolling the massage tool under the foot. At step 1021, the method 1000 can include rolling the massage tool 100 back and forth between the flat surface 40 and a heel of a foot. At step 1021, the method 1000 can further include orienting the first end portion 11 of the body 10 toward the heel. At step 1022, the method 1000 can include rolling the massage tool 100 back and forth between the flat surface 40 and an outside of the foot. At step 1022, the method 1000 can further include orienting the first end portion 11 of the body 10 toward the outside of the foot. At step 1023, the method 1000 can include rolling the massage tool 100 back and forth between the flat surface 40 and an arch of the foot. At step 1023, the method 1000 can further include orienting the first end portion 11 of the body 10 toward the arch of the foot. At step 1030, the method 1000 can include pressing the foot onto the massage tool 100 while the massage tool 100 is stationary. At step 1031, the method 1000 can include pressing the massage tool 100 into each web space between a set of toes while leaning forward and backward, where the set of toes can include a big toe, an index toe, a third toe, a fourth toe, and a pinky toe. At step 1031, the method 1000 can further include orienting the first end portion 11 of the body 10 toward the heel. In accordance with the disclosed subject matter, the method 1000 can repeat one or more steps of the method of FIG. 7, where appropriate. Moreover, although this disclosure describes and illustrates an example method 1000 including the particular steps of the method of FIG. 7, this disclosure contemplates any suitable method including any suitable steps, which can include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
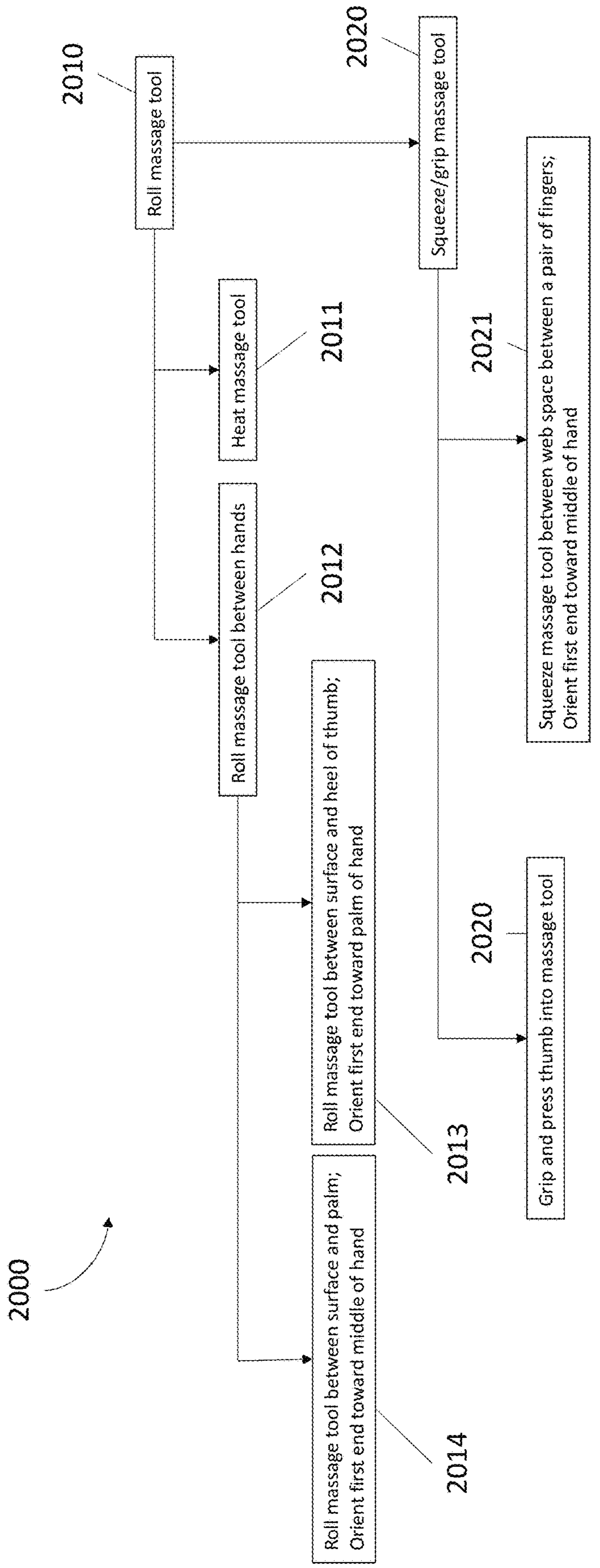
FIG. 8 illustrates a method for using the massage tool in accordance with the disclosed subject matter.

FIG. 8 illustrates an example method 2000 in accordance with the disclosed subject matter. At step 2010, the method 2000 can include rolling the massage tool 100. Optionally, prior to step 2010, the massage tool 100 can be frozen or cooled, for example, by placing the massage tool 100 in a freezer. Alternatively, prior to step 2010, the massage tool 100 can be heated. At step 2011, the method 2000 can include rolling the massage tool 100 between a right and left hand while pressing the massage tool 100 between the right and left hand. Alternatively, at step 2012, the method 2000 can include rolling the massage tool 100 back and forth between the flat surface 40 and a hand. At step 2013, the method 2000 can include rolling the massage tool 100 back and forth between the flat surface 40 and a heel of a thumb. At step 2013, the method 2000 can further include orienting the first end portion 11 of the body 10 toward a palm of the hand. At step 2014, the method 2000 can include rolling the massage tool 100 back and forth between the flat surface 40 and the palm. At step 2014, the method 2000 can further include orienting the first end portion 11 of the body 10 toward a middle of the hand. At step 2020, the method 2000 can include squeezing or gripping the massage tool 100. At step 2021, the method 2000 can include squeezing the massage tool 100 between each web space between a set of fingers, where the set of fingers can include the thumb, an index finger, a middle finger, a ring finger, and a pinky finger. At step 2021, the method 2000 can further include orienting the first end portion 11 of the body 10 toward the middle of the hand. At step 2022, the method 2000 can include gripping the massage tool 100 in one hand. At step 2022, the method 2000 can further include pressing a thumb onto the proximal side of the massage tool 100, pressing the thumb onto the distal side of the massage tool 100, and pressing the thumb onto the second end portion of the massage tool 100. In accordance with the disclosed subject matter, the method 2000 can repeat one or more steps of the method of FIG. 8, where appropriate. Moreover, although this disclosure describes and illustrates an example method 2000 including the particular steps of the method of FIG. 8, this disclosure contemplates any suitable method including any suitable steps, which can include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
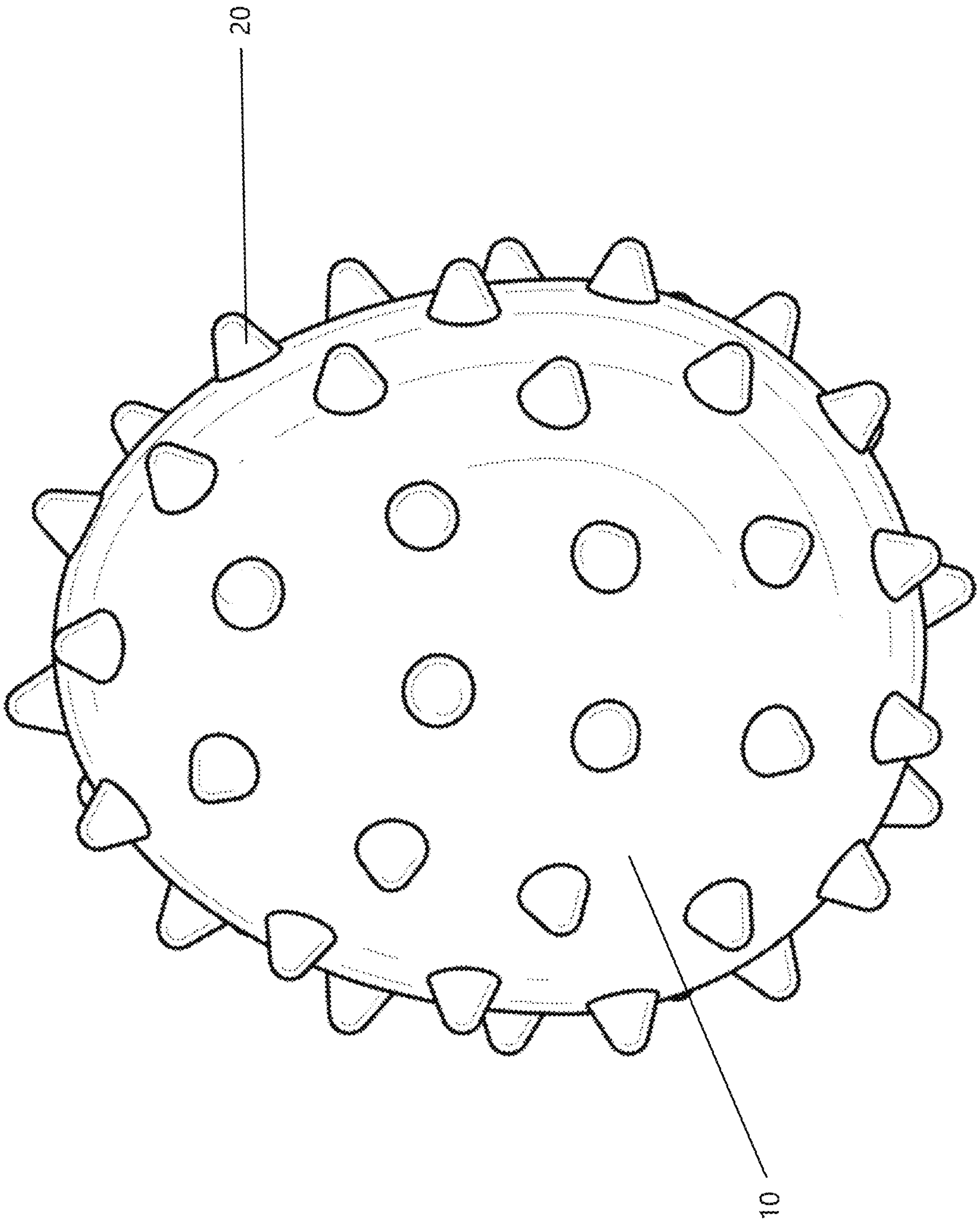
FIG. 9 illustrates a top-front isometric view of the massage tool of FIG. 1A.
Figure 10:
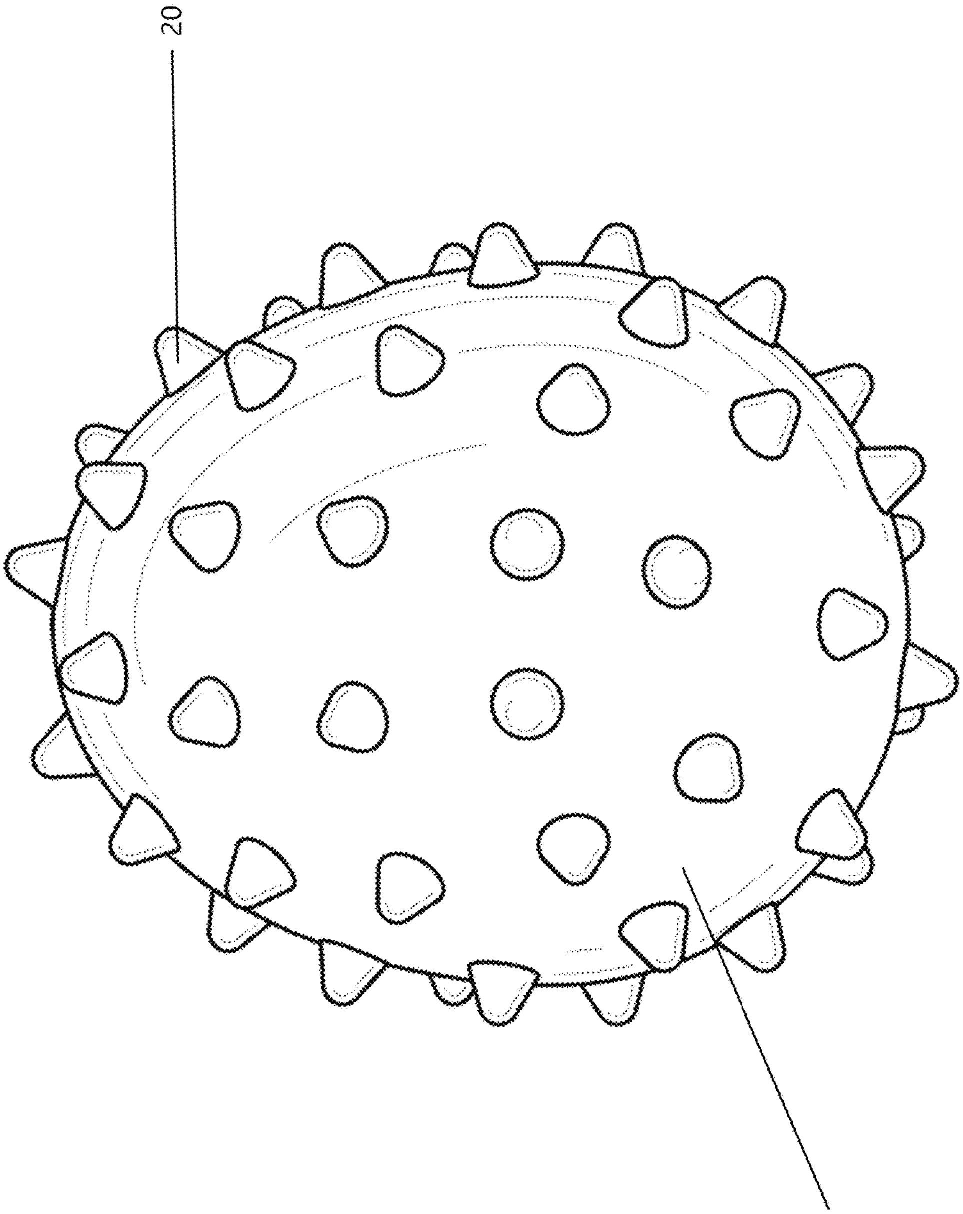
FIG. 10 illustrates a bottom-back isometric view of the massage tool of FIG. 1A.
Figure 11:
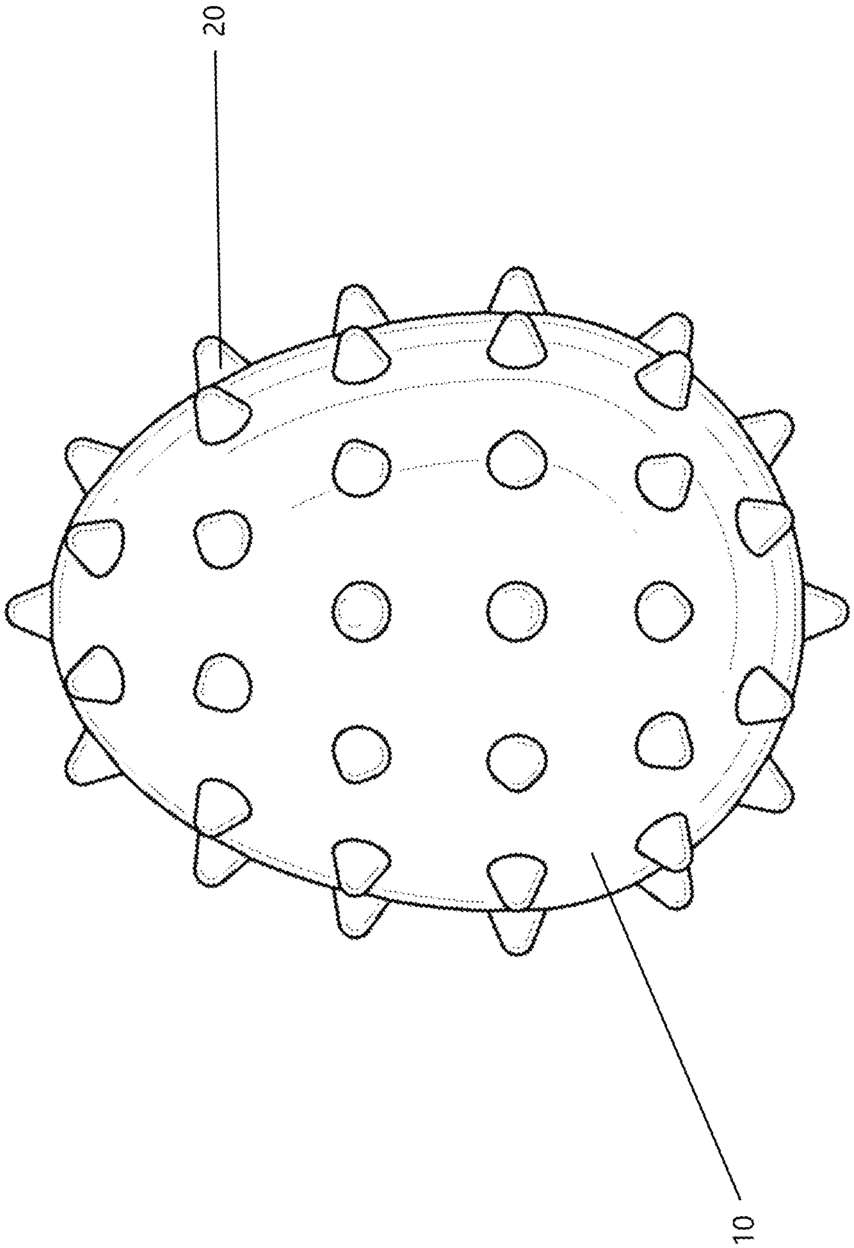
FIG. 11 illustrates a front view of the massage tool of FIG. 1A.
Figure 12:
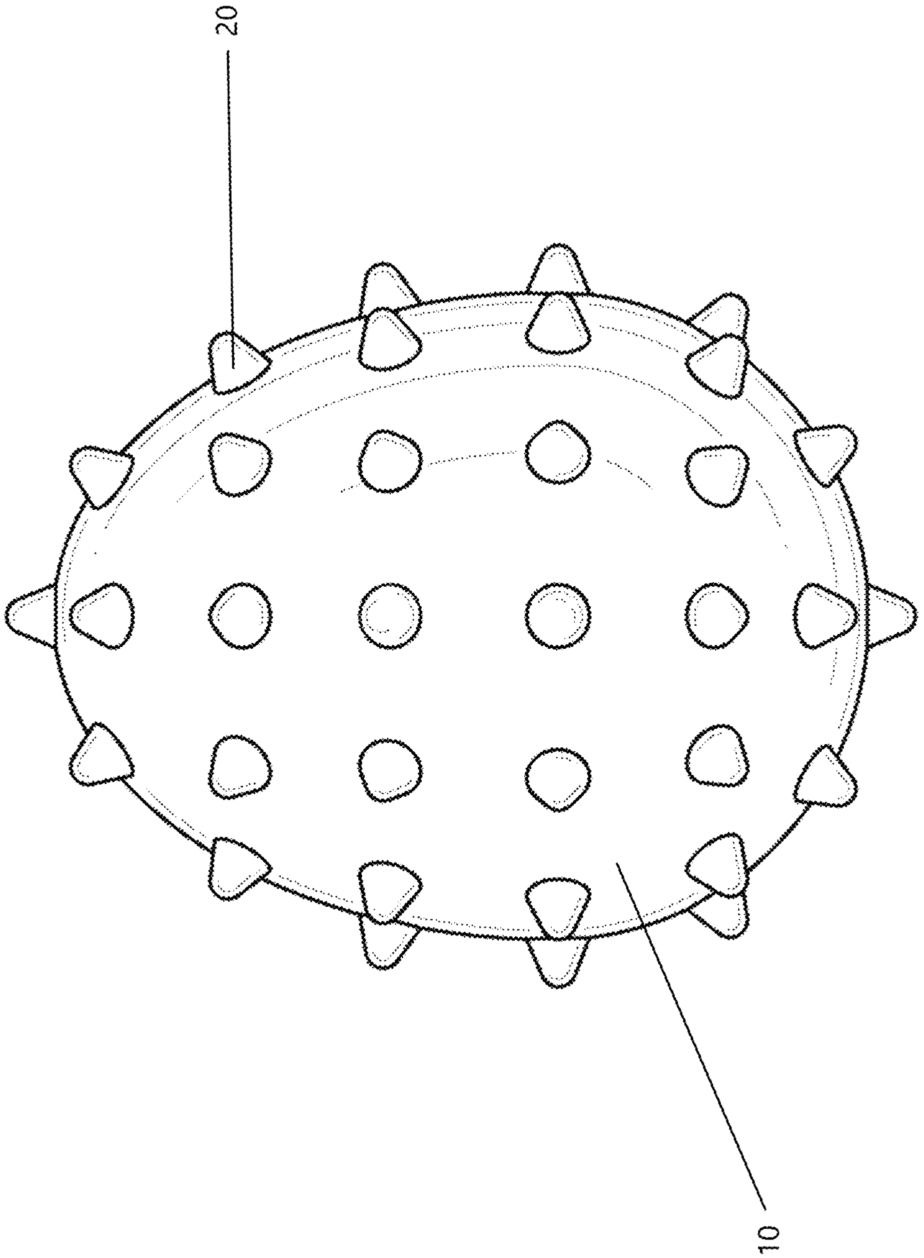
FIG. 12 illustrates a left view of the massage tool of FIG. 1A.

FIG. 9 is included to further illustrate a top-front isometric view of the massage tool 100. FIG. 10 is included to illustrate a bottom-back isometric view of the massage tool 100. FIG. 11 is included to illustrate a front view of the massage tool 100. Notably, the front and back views of the massage tool 100 are identical. FIG. 12 is included to illustrate a left view of the massage tool 100. Notably, the left and right views of the massage tool 100 are identical.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the methods and systems of the disclosed subject matter without departing from the spirit or scope of the disclosed subject matter. Thus, it is intended that the disclosed subject matter include modifications and variations that are within the scope of the appended claims and their equivalents.

What is claimed is:

1. A massage tool, comprising:

an egg-shaped body having a first end portion and a second end portion, wherein a diameter of the first end portion is greater than a diameter of the second end portion, the body is formed of a uniform, solid material, and the body has a rigidity; and a plurality of protuberances extending radially from the body, each protuberance of the plurality of protuberances being formed of the uniform, solid material, and each protuberances of the plurality of protuberances having a first end portion and a second end portion, wherein the first end portion of each protuberance is integral with the body and the second end portion of each protuberances extends radially from the body;

wherein the protuberances are arranged in an even number of equidistant rows throughout the body such that the protuberances are aligned along a major axis of the massage tool;

wherein the equidistant rows include:

a first middle row extending around a first middle circumference of the egg-shaped body, the first middle row having first middle row protuberances of the plurality of protuberances, the first middle row protuberances having a first number of protuberances, a second middle row extending around a second middle circumference of the egg-shaped body, the second middle row is adjacent to the first middle row, the second middle row having second middle row protuberances of the plurality of protuberances, the second middle row protuberances having a second number of protuberances, a third row extending around a third circumference of the egg-shaped body, the third row is adjacent to the first middle row, the third row having third row protuberances of the plurality of protuberances, the third row protuberances having a third number of protuberances, a fourth row extending around a fourth circumference of the egg-shaped body, the fourth row is adjacent to the second middle row, the fourth row having fourth row protuberances of the plurality of protuberances, the fourth row protuberances having a fourth number of protuberances;

a fifth row extending around a fifth circumference of the egg-shaped body, the fifth row is adjacent to the fourth row, the fifth row having a fifth row protuberances having a fifth number of protuberances; and a sixth row extending around a sixth circumference of the egg-shaped body, the sixth row is adjacent to the third row, the sixth row having a sixth row protuberances of the plurality of protuberances having a sixth number of protuberances, wherein the fifth row is adjacent to the second end portion, the sixth row is adjacent to the first end portion, wherein each of the first number of protuberances, the second number of protuberances and the third number of protuberances is twelve, wherein each of the fifth number protuberances and the sixth number of protuberances is six and wherein the fourth number protuberances is ten, wherein the protuberances of the first middle row and the second middle row are aligned such that the massage tool rests on four equidistant protuberances when placed on a flat surface; and wherein each of the plurality of protuberances has a conical shape and has a rigidity, the rigidity of each protuberance is less than the rigidity of the body.

2. The massage tool of claim 1, wherein the body and plurality of protuberances each have a durometer hardness of about 20 Shore A.

3. The massage tool of claim 1, wherein the massage tool is capable of withstanding an applied force of 950 N.

4. The massage tool of claim 1, wherein the uniform, solid material comprises a thermoplastic rubber.

5. The massage tool of claim 1, wherein the second end portion of each of the plurality of protuberances is rounded.

6. The massage tool of claim 1, wherein the first end portion of each of the plurality of protuberances has a diameter and the second end portion of each of the plurality of protuberances has a diameter and the diameter of the first end portion of each of the plurality of protuberances is greater than the diameter of the second end portion of each of the plurality of protuberances.

7. The massage tool of claim 1, wherein the diameter of the first end portion of the body does not exceed about 40 mm.

8. The massage tool of claim 1, wherein a length of the body does not exceed about 50 mm.

9. The massage tool of claim 1, wherein a diameter of each of the plurality of protuberances does not exceed about 5/16 of an inch.

10. The massage tool of claim 1, wherein a height of each of the plurality of protuberances does not exceed about 1/4 of an inch.

11. A method of using a massage tool, comprising:

providing the massage tool comprising:

an egg-shaped body comprised of a first end portion and a second end portion, wherein a diameter of the first end portion is greater than a diameter of the second end portion;

the body is comprised of a uniform, solid material; and the body has a rigidity;

a plurality of protuberances extending radially from the body, wherein each protuberance of the plurality of protuberances has a first end portion and a second end portion, wherein the first end portion of each protuberance is integral with the body and the second end portion of each protuberance extends radially from the body; the protuberances are arranged in an even number of equidistant rows throughout the body such that the protuberances are aligned along a major axis of the massage tool;

the equidistant rows include:

a first middle row extending around a first middle circumference of the egg-shaped body, the first middle row having first middle row protuberances of the plurality of protuberances, the first middle row protuberances having a first number of protuberances, a second middle row extending around a second middle circumference of the egg-shaped body, the second middle row is adjacent to the first middle row, the second middle row having second middle row protuberances of the plurality of protuberances, the second middle row protuberances having a second number of protuberances, a third row extending around a third circumference of the egg-shaped body, the third row is adjacent to the first middle row, the third row having third row protuberances of the plurality of protuberances, the third row protuberances having a third number of protuberances, a fourth row extending around a fourth circumference of the egg-shaped body, the fourth row is adjacent to the second middle row, the fourth row having fourth row protuberances of the plurality of protuberances, the fourth row protuberances having a fourth number of protuberances;

a fifth row extending around a fifth circumference of the egg-shaped body, the fifth row is adjacent to the fourth row, the fifth row having a fifth row protuberances having a fifth number of protuberances; and a sixth row extending around a sixth circumference of the egg-shaped body, the sixth row is adjacent to the third row, the sixth row having a sixth row protuberances of the plurality of protuberances having a sixth number of protuberances, wherein the fifth row is adjacent to the second end portion, the sixth row is adjacent to the first end portion, wherein each of the first number of protuberances, the second number of protuberances and the third number of protuberances is twelve, wherein each of the fifth number protuberances and the sixth number of protuberances is six and wherein the fourth number protuberances is ten, the protuberances of the first middle row and the second middle row are aligned such that the massage tool rests on four equidistant protuberances when placed on a flat surface;

the protuberances are comprised of the uniform, solid material; and each of the plurality of protuberances has a conical shape and has a rigidity, wherein the rigidity of each protuberance is less than the rigidity of the body;

placing the massage tool on the flat surface;

pressing a foot onto the massage tool while rolling the massage tool under the foot; and pressing the foot onto the massage tool while the massage tool is stationary.

12. A method of using a massage tool, comprising:

providing the massage tool comprising:

an egg-shaped body comprised of a first end portion and a second end portion, wherein a diameter of the first end portion is greater than a diameter of the second end portion;

the body is comprised of a uniform, solid material; and the body has a rigidity;

a plurality of protuberances extending radially from the body, wherein each protuberance of the plurality of protuberances has a first end portion and a second end portion, wherein the first end portion of each protuberance is integral with the body and the second end portion of each protuberance extends radially from the body; the protuberances are arranged in an even number of equidistant rows throughout the body such that the protuberances are aligned along a major axis of the massage tool;

the equidistant rows include:

a first middle row extending around a first middle circumference of the egg-shaped body, the first middle row having first middle row protuberances of the plurality of protuberances, the first middle row protuberances having a first number of protuberances, a second middle row extending around a second middle circumference of the egg-shaped body, the second middle row is adjacent to the first middle row, the second middle row having second middle row protuberances of the plurality of protuberances, the second middle row protuberances having a second number of protuberances, a third row extending around a third circumference of the egg-shaped body, the third row is adjacent to the first middle row, the third row having third row protuberances of the plurality of protuberances, the third row protuberances having a third number of protuberances, a fourth row extending around a fourth circumference of the egg-shaped body, the fourth row is adjacent to the second middle row, the fourth row having fourth row protuberances of the plurality of protuberances, the fourth row protuberances having a fourth number of protuberances;

a fifth row extending around a fifth circumference of the egg-shaped body, the fifth row is adjacent to the fourth row, the fifth row having a fifth row protuberances having a fifth number of protuberances; and a sixth row extending around a sixth circumference of the egg-shaped body, the sixth row is adjacent to the third row, the sixth row having a sixth row protuberances of the plurality of protuberances having a sixth number of protuberances, wherein the fifth row is adjacent to the second end portion, the sixth row is adjacent to the first end portion, wherein each of the first number of protuberances, the second number of protuberances and the third number of protuberances is twelve, wherein each of the fifth number protuberances and the sixth number of protuberances is six and wherein the fourth number protuberances is ten, the protuberances of the first middle row and the second middle row are aligned such that the massage tool rests on four equidistant protuberances when placed on a flat surface;

the protuberances are comprised of the uniform, solid material; and each of the plurality of protuberances has a conical shape and has a rigidity, wherein the rigidity of each protuberance is less than the rigidity of the body;

rolling the massage tool between a right hand and a left hand while pressing the massage tool between the right hand and the left hand; and squeezing the massage tool between two fingers.

13. The method of claim 12 further comprising:

gripping the massage tool in either the left hand or the right hand;

pressing a thumb onto a proximal side of the massage tool;

pressing the thumb onto a distal side of the massage tool, wherein the distal side is opposite the proximal side relative to a minor axis; and pressing the thumb onto the second end portion of the massage tool.

* * * * *